(12) United States Patent
Johnston et al.

(10) Patent No.: US 10,279,405 B2
(45) Date of Patent: May 7, 2019

(54) CUTTING ASSEMBLY (71) Applicant: Solar Turbines Incorporated, San Diego, CA (US)

(72) Inventors: Ronald Kevin Johnston, El Cajon, CA (US); Michael Ramon Nielson, Ramona, CA (US)

(73) Assignee: Solar Turbines Incorporated, San Diego, CA (US)

( * ) Notice: Subject to any disclaimer, the term of this patent is extended or adjusted under 35 U.S.C. 154(b) by 42 days.

(21) Appl. No.: 15/581,895

(22) Filed: Apr. 28, 2017

(65) Prior Publication Data
US 2018/0311750 A1 Nov. 1, 2018

(51) Int. Cl.
B23D 55/04 (2006.01)
B23D 53/04 (2006.01)

(52) U.S. Cl.
CPC ............ B23D 55/04 (2013.01); *B23D 53/045* (2013.01)

(58) Field of Classification Search
CPC .... B23D 55/04; B23D 53/003; B23D 53/045; B23D 53/08; B23D 53/06; B12D 53/12; Y10T 83/7264; Y10T 83/7547; Y10T 83/7553; Y10T 83/758
See application file for complete search history.

(56) References Cited

U.S. PATENT DOCUMENTS

| 2,630,622 | A | 3/1953 | Beck |
| 3,465,628 | A | 9/1969 | Komendowski et al. |
| 3,570,346 | A | 3/1971 | Koinzan |
| 3,575,074 | A | 4/1971 | Aizawa |
| 3,789,717 | A | 2/1974 | Stolzer |
| 3,862,583 | A * | 1/1975 | Tsuchiya ............ B23D 53/045 83/165 |
| 3,991,637 | A | 11/1976 | Boge |
| 5,671,915 | A | 9/1997 | Williams |
| 9,878,381 | B2 * | 1/2018 | Sakai ..................... B23D 55/04 |
| 2012/0180611 | A1 | 7/2012 | Tokiwa |
| 2016/0236290 | A1 * | 8/2016 | Behringer ............. B23Q 3/066 |

FOREIGN PATENT DOCUMENTS

| FR | 2137020 A1 * | 12/1972 | ............. B23D 55/04 |
| GB | 1500659 A * | 2/1978 | ........... B23D 51/043 |

* cited by examiner

*Primary Examiner* — Jennifer B Swinney (74) *Attorney, Agent, or Firm* — James R. Smith (57) ABSTRACT

A cutting assembly for cutting a workpiece includes a frame, a fixture, and a saw. The fixture is coupled to the frame, and is configured to receive the workpiece. The saw has a cutter to cut the workpiece. The saw is pivotally coupled to the frame. The cutting assembly further includes a locking assembly for locking the workpiece within the fixture. The locking assembly includes a lock structure pivotally coupled to the fixture. The lock structure is configured to lock the workpiece within the fixture. The locking assembly further includes a telescopic structure coupled to the saw and the lock structure. The telescopic structure is configured to move the lock structure in response to a pivotal movement of the saw. The telescopic structure facilitates a locking, by the lock structure, of the workpiece within the fixture.

19 Claims, 7 Drawing Sheets

CUTTING ASSEMBLY

TECHNICAL FIELD

The present disclosure relates to a cutting assembly for cutting a workpiece. More particularly, the present disclosure relates to a cutting assembly including a locking assembly to lock the workpiece during cutting.

BACKGROUND

Generally, cutting of workpieces, such as tubes, is required during an assembly of a machine such as turbomachine. Generally, a cutting tool such as a hack saw is utilized to cut the workpieces. Cutting workpieces using the hack saw is a manual operation that may involve clamping, cutting and releasing the workpiece, which is a labor intensive and time consuming task.

U.S. Pat. No. 2,630,622 relates to a power saw for cutting a stock having an automatic vise for holding the stock. The vise includes a wedge for locking the stock within the vise. The wedge is normally depressed for locking the stock within the vise. The wedge releases the stock when a saw frame is lifted upwards.

U.S. Pat. No. 3,570,346 relates to a band saw for cutting a workpiece having a vise for holding the stock. The vise includes a movable jaw that is pulled away from the fixed jaw to a sufficient distance so as to allow the workpiece to fit between the jaws. The movable jaw is moved to clamp the workpiece in response to lowering of a control lever. Further, as the control lever is raised, elevating the saw blade away from the workpiece, the movable jaw will release the workpiece.

SUMMARY

In accordance with an embodiment, the present disclosure relates to a cutting assembly for cutting a workpiece. The cutting assembly includes a frame, a fixture coupled to the frame and configured to receive the workpiece, and a saw having a cutter to cut the workpiece, and pivotally coupled to the frame. The cutting assembly further includes a locking assembly for locking the workpiece within the fixture. The locking assembly includes a lock structure and a telescopic structure. The lock structure is pivotally coupled to the fixture, and is configured to lock the workpiece within the fixture. The telescopic structure is coupled to the saw and the lock structure, and is configured to move the lock structure in response to a pivotal movement of the saw. Further, the telescopic structure facilitates a locking, by the lock structure, of the workpiece within the fixture.

In accordance with another embodiment, the present disclosure relates to a cutting assembly for cutting a workpiece. The cutting assembly includes a frame, a fixture, and a saw. The fixture is coupled to the frame, and is configured to receive the workpiece. The saw has a cutter to cut the workpiece, and is pivotally coupled to the frame. The cutting assembly further includes a locking assembly for locking the workpiece within the fixture. The locking assembly includes a lock structure that is pivotally coupled to the fixture. The lock structure is configured to lock the workpiece within the fixture. The locking assembly further includes a telescopic structure configured to move the lock structure in response to a pivotal movement of the saw. The telescopic structure includes an outer member and an inner member slidably disposed within the outer member. The inner member is coupled with the lock structure, and is biased to an extended position relative to the outer member to facilitate a locking, by the lock structure, of the workpiece within the fixture.

DESCRIPTION

Referring to FIGS. 1 to 7, a cutting assembly 100 is shown. The cutting assembly 100 is configured for cutting a workpiece 200 (shown in FIG. 4). In an exemplary embodiment, the workpiece 200 may be a tube or pipe used in turbomachines. Although, the tube is contemplated as the workpiece 200, it may be appreciated that the workpiece 200 may be a block, a shaft, a plate, or any other similar object.

The cutting assembly 100 includes a frame 102, a saw 104, a fixture 106, and a locking assembly 108. The frame 102 includes a first end 110 and a second end 112, and is configured to support the saw 104, the fixture 106, and the locking assembly 108. The saw 104 may be pivotally coupled to the frame 102, and is configured to pivot between a first position (shown in FIG. 1) and a second position (shown in FIG. 2) relative to the frame 102. The saw 104 may be pivotally coupled proximate to the first end 110 of the frame 102. In the illustrated embodiment, the saw 104 is pivotally coupled to a bracket 114 of the frame 102.

The saw 104 includes a saw frame 116, a cutter 118, and a linkage assembly 120. The saw frame 116 acts as a support structure for the cutter 118 and the linkage assembly 120. The saw frame 116 may also act as a support structure for various other components of the saw 104 such as a battery. The saw frame 116 may also include a handle 122 that facilitate holding of the saw 104 by an operator. The cutter 118 may be coupled proximate to a lower end 124 of the saw frame 116, while the linkage assembly 120 may be coupled proximate to an upper end 126 of the saw frame 116. In an implementation, the cutter 118 may be a band cutter that may be electrically operated to perform a cutting operation on the workpiece 200. The cutter 118 may include a plurality of tooth to cut the workpiece 200. In an implementation, the plurality of tooth may be angled towards the second end 112 of the frame 102. Although, a band cutter is contemplated, it may be understood that any other type of cutter such as a chain cutter may also be utilized.

Figure 1:
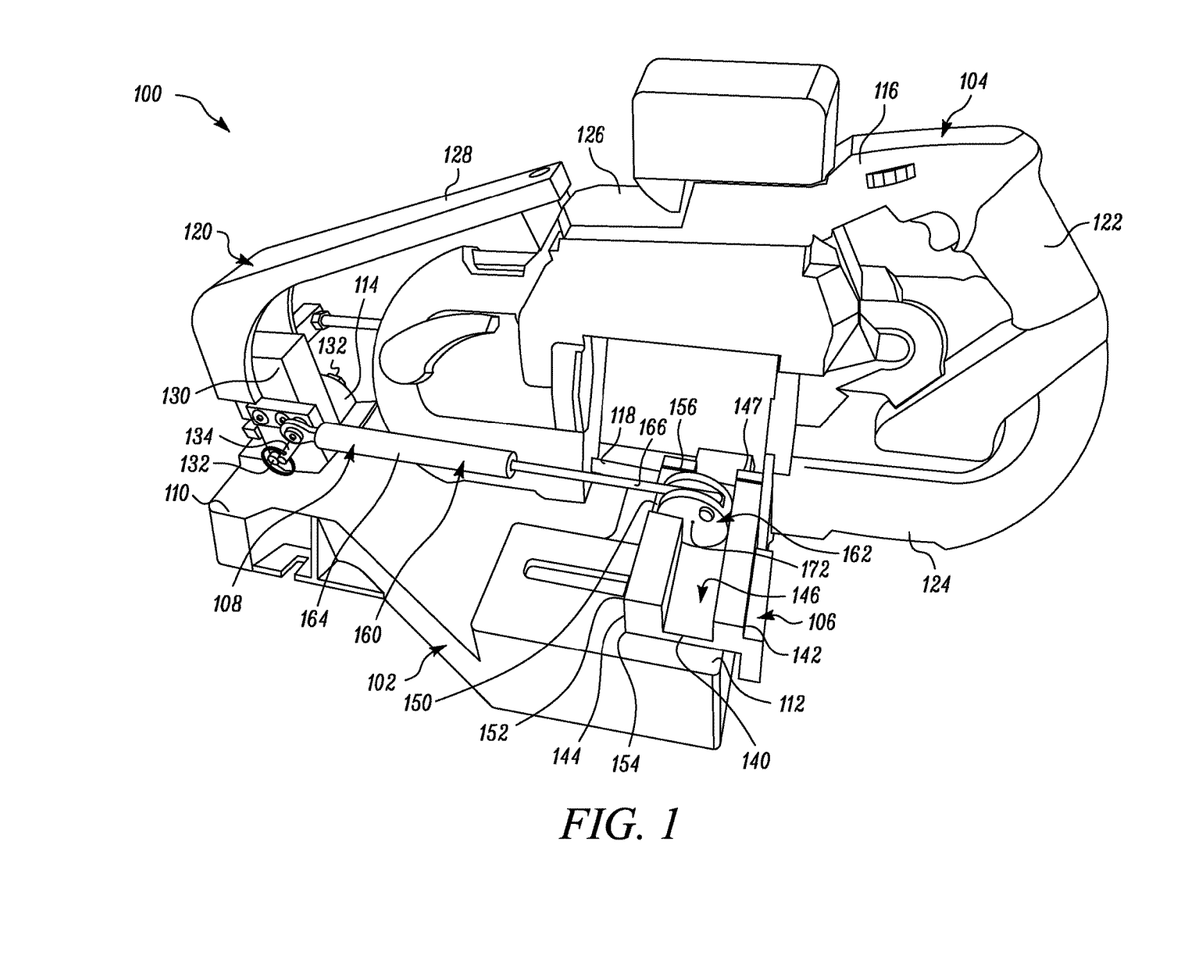
FIG. 1 illustrates a cutting assembly depicting a saw in a first position, in accordance with an embodiment of the disclosure.
Figure 2:
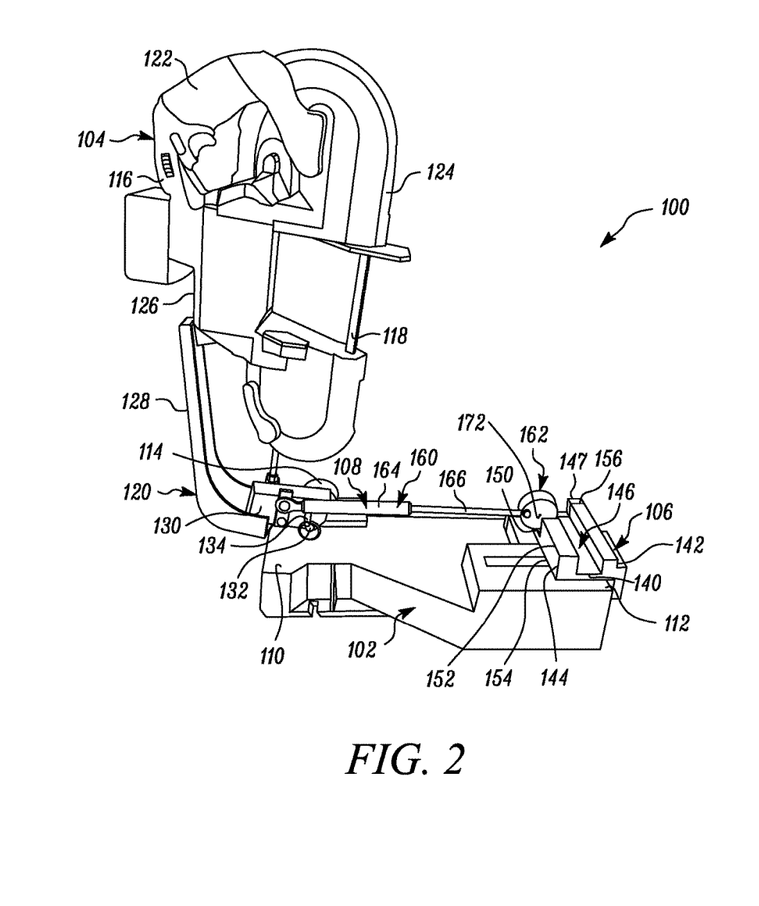
FIG. 2 illustrates the cutting assembly depicting the saw in a second position, in accordance with an embodiment of the disclosure.
Figure 3:
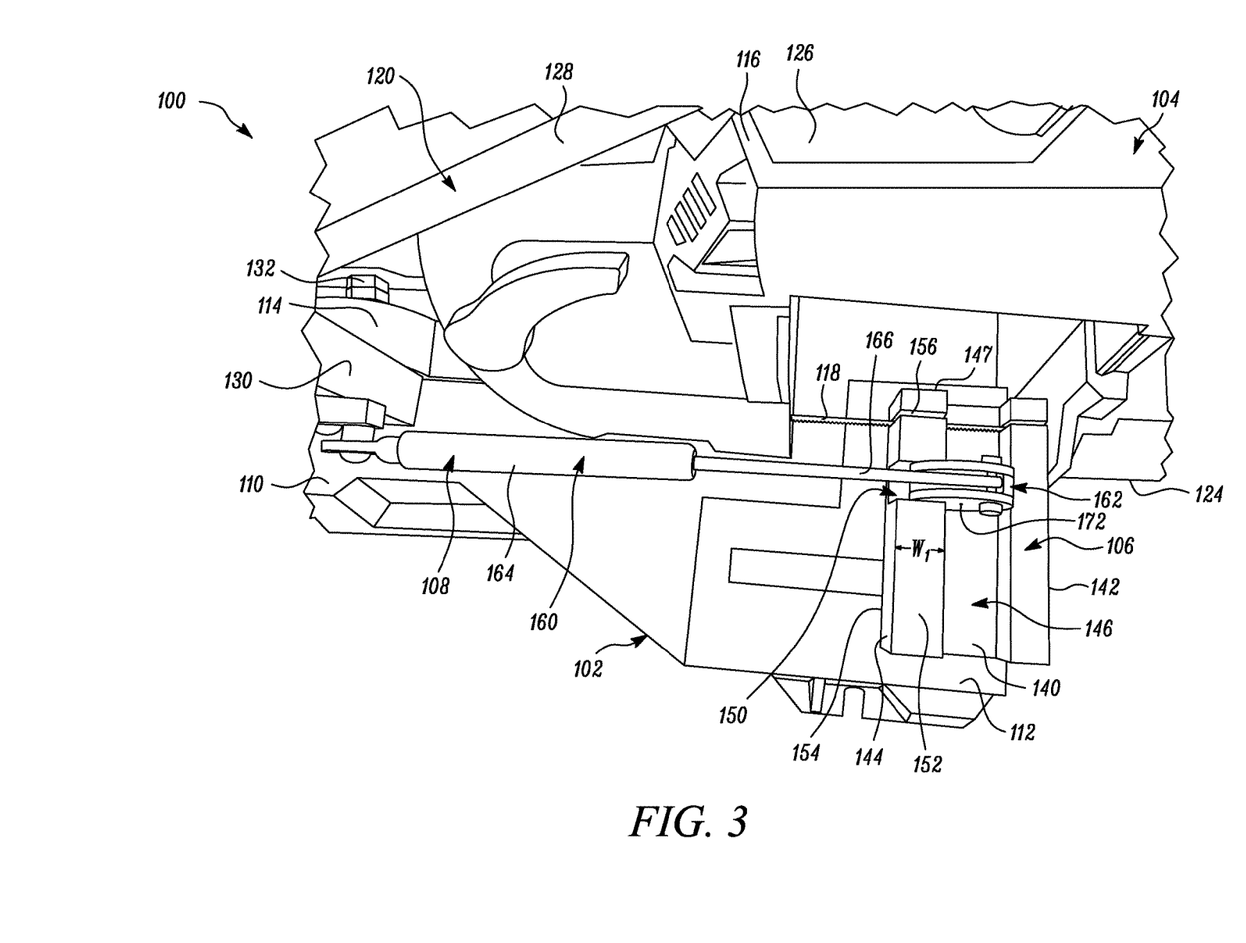
FIG. 3 illustrates a partial top view of the cutting assembly depicting the saw in the first position, in accordance with an embodiment of the disclosure.
Figure 4:
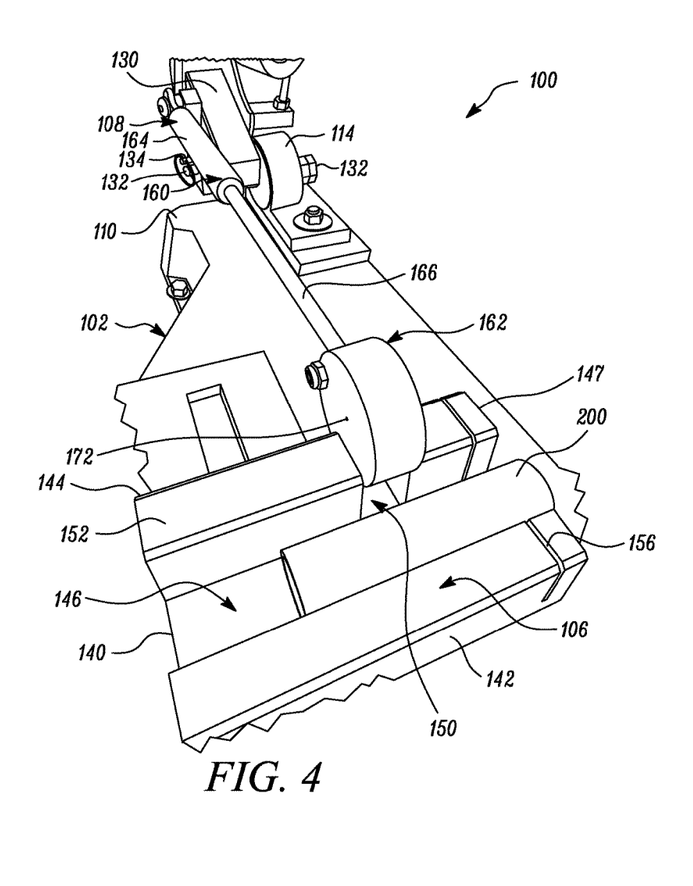
FIG. 4 illustrates a partial perspective view of the cutting assembly depicting a workpiece positioned within a fixture of the cutting assembly, in accordance with an embodiment of the disclosure.
Figure 5:
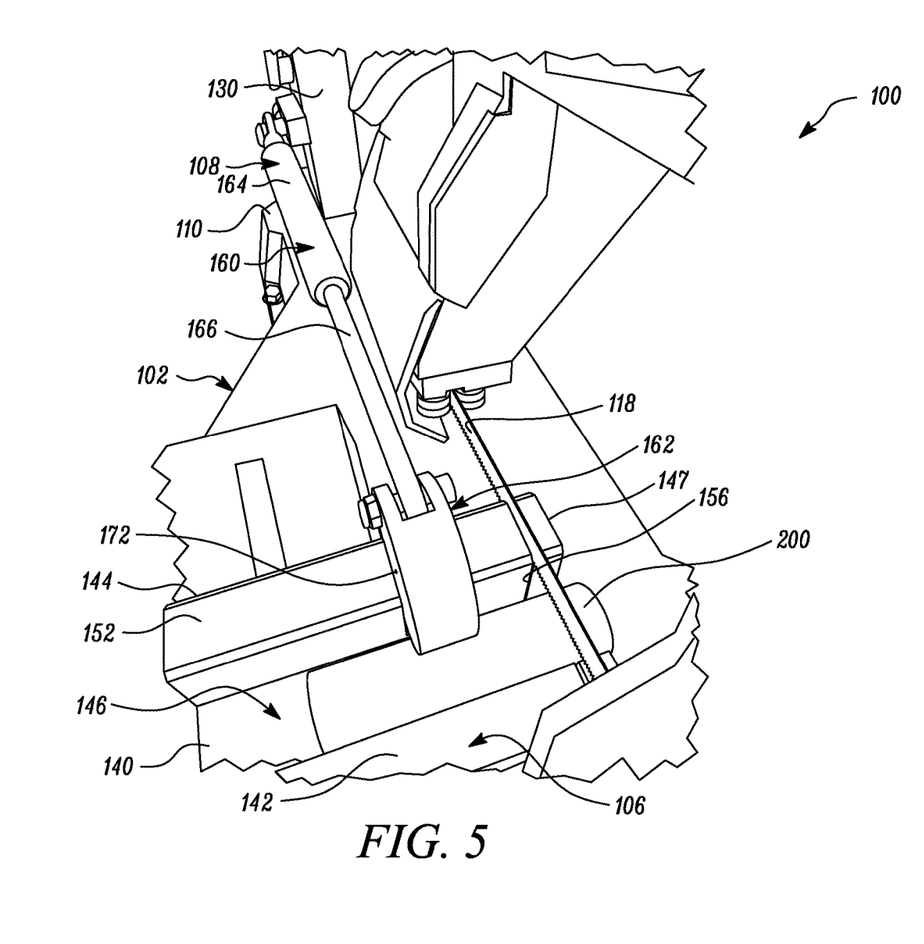
FIG. 5 illustrates a partial perspective view of the cutting assembly depicting the workpiece positioned within the fixture of the cutting assembly, and the saw in the cutting position, in accordance with an embodiment of the disclosure.

In certain implementations, the linkage assembly 120 may include an arm 128 coupled to the saw frame 116, and a block 130 pivotally coupled to the frame 102 of the cutting assembly 100. In an embodiment, the arm 128 may include an L shape, and may be fixedly attached to the saw frame 116 as well as to the block 130. In other implementations, the block 130 may be omitted, and in such a case, an end of the arm 128 may be fixedly attached to the saw frame 116, while the other end of the arm 128 may be pivotally attached with the frame 102. The pivotal attachment of the linkage assembly 120 with the frame 102 enables a pivotal movement of the saw 104 relative to the frame 102 about pivot 132 between the first position and the second position. In the first position of the saw 104, the cutter 118 may be substantially parallel to the frame 102 (as shown in FIG. 1), while in the second position of the saw 104, the cutter 118 may be substantially perpendicular to the frame 102 (shown in FIG. 2). Further, the saw 104 may be pivoted/moved to a cutting position (shown in FIG. 5) between the first position and the second position to cut the workpiece 200. In the cutting position of the saw 104, the cutter 118 may contact the workpiece 200 (shown in FIG. 5).

The cutting assembly 100 may further include a pin 134 that may be engaged with the linkage assembly 120 and the frame 102 to restrict the pivotal movement of the saw 104 about the pivot 132. In an embodiment, the pin 134 may extend through a hole formed into the block 130, and be at least partially inserted into an opening formed in the bracket 114 to prevent the pivotal movement of the saw 104 relative to the frame 102. To enable the pivotal movement of the saw 104 relative to the frame 102, the pin 134 may be pulled out of the opening of the bracket 114. The pin 134 may be inserted into the opening of the bracket 114 when the saw 104 is at the second position to prevent an undesired movement of the saw 104 towards the first position.

The fixture 106 is configured to receive the workpiece 200, and is coupled to the frame 102. In the illustrated embodiment, the fixture 106 is coupled to the second end 112 of the frame 102, and may extend along a lateral direction of the frame 102. The fixture 106 may be attached to the frame 102 by using fasteners or any other suitable means known in the art. The fixture 106 may include a U-shaped structure having a base 140, a first sidewall 142, and a second sidewall 144 substantially parallel to the first sidewall 142. The fixture 106 also defines a first cavity 146 to receive the workpiece 200. The first cavity 146 may extend along an entire length of the fixture 106 and may be defined between the sidewalls 142, 144.

The fixture 106 may further define a second cavity 150 (best shown in FIGS. 3 and 4) formed in the second sidewall 144 of the fixture 106. The second cavity 150 may extend from an upper end 152 of the second sidewall 144 to a lower end 154 of the second sidewall 144. Further, the second cavity 150 also extends throughout an entire width 'W1' (see FIG. 3) of the second sidewall 144. In certain implementations, the fixture 106 may include a slot 156 that extends into the base 140, the first sidewall 142, and the second sidewall 144 to guide the cutter 118. The cutter 118 may extend though the slot 156 in the cutting position and the second position of the saw 104. Further, the fixture 106 is coupled to the locking assembly 108. In the illustrated embodiment, the second sidewall 144 is coupled to the locking assembly 108.

Figure 6:
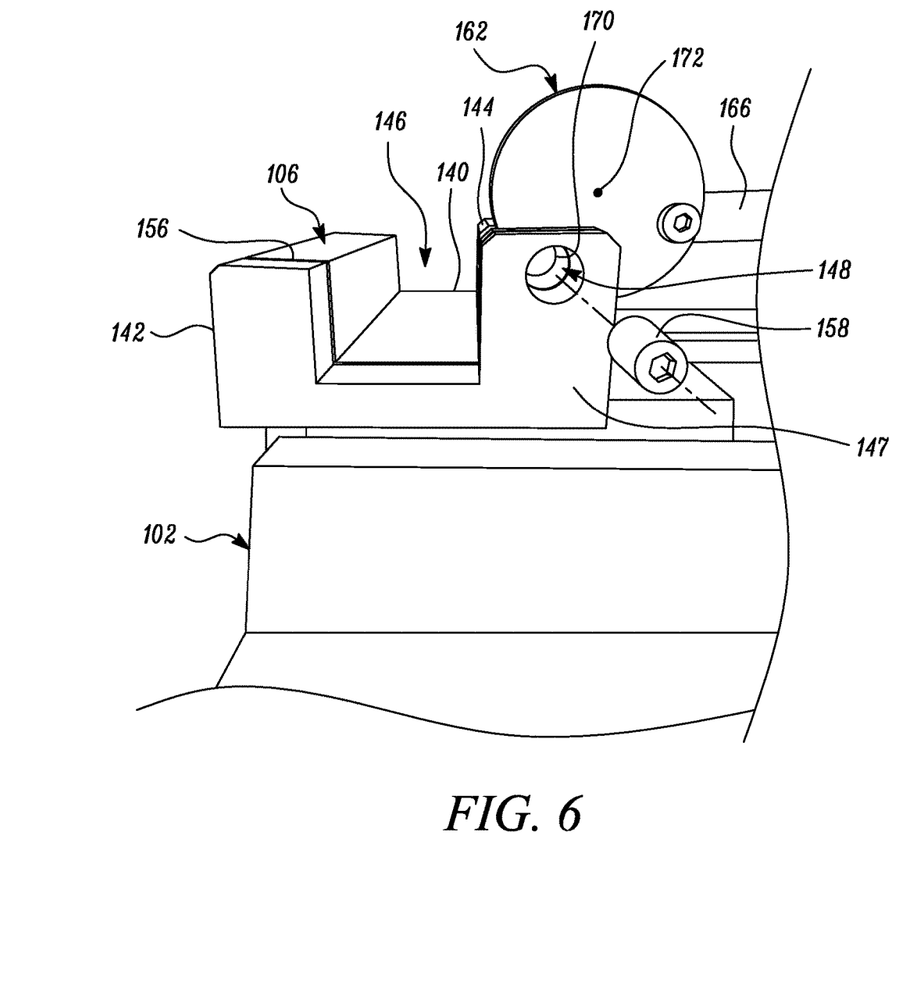
FIG. 6 illustrates a view of the fixture and a lock structure of the cutting assembly, in accordance with an embodiment of the disclosure.
Figure 7:
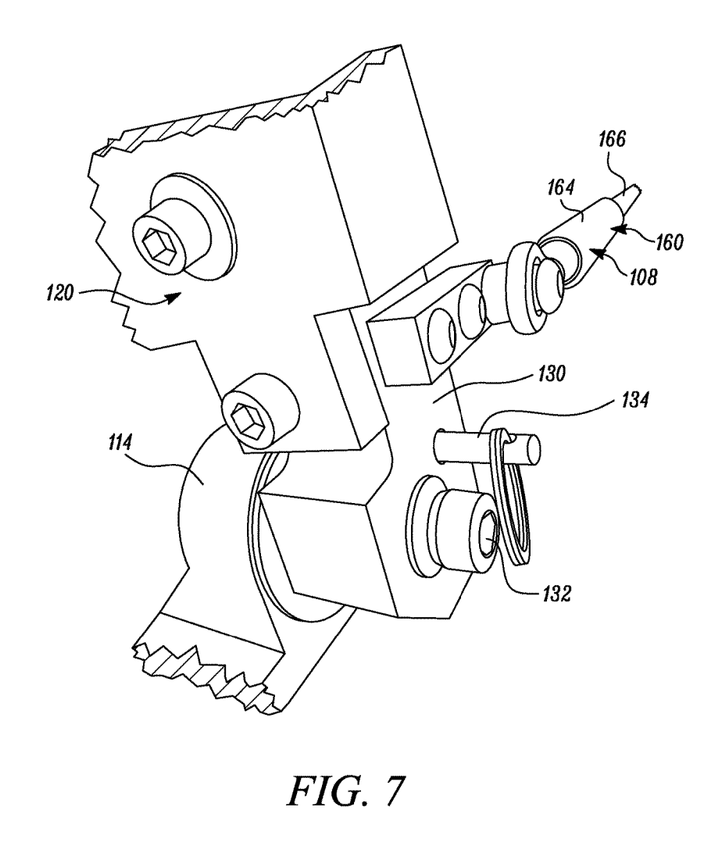
FIG. 7 illustrates a partial perspective view of the cutting assembly depicting a coupling of a linkage assembly of the saw with a frame of the cutting assembly, in accordance with an embodiment of the disclosure.

Referring to FIG. 6, the fixture 106 may further include an opening 148 formed in the second sidewall 144. The opening 148 may extend from an end 147 of the fixture 106 to the second cavity 150. A pin 158 may extend through the opening 148 and engage with the locking assembly 108 to pivotally couple the locking assembly 108 with the fixture 106 (second sidewall 144). In an embodiment, the pin 158 may be an allen bolt which extends from the lock structure 162 to the slot 156 to couple the fixture 106 with the locking assembly 108. In this manner, the pin 158 does not extend into the slot 156 in the assembled position, and thereby ensure smooth movement of the cutter 118 within the slot 156. In an embodiment, the pin 158 may be inserted through an opening that extends into the second sidewall 144 from the other end of the fixture 106 to the second cavity 150.

The locking assembly 108 is configured to lock the workpiece 200 within the fixture 106 during cutting of the workpiece 200. The locking assembly 108 includes a telescopic structure 160 and a lock structure 162 to lock the workpiece 200 within the first cavity 146 of the fixture 106, during cutting. The telescopic structure 160 is configured to move towards the second end 112 of the frame 102 as the saw 104 moves towards the first position from the second position. Also, the telescopic structure 160 is configured to move away from the second end 112 of the frame 102 as the saw 104 moves towards the second position from the first position.

The telescopic structure 160 includes an outer member 164 that may be coupled to the linkage assembly 120 of the saw 104, and an inner member 166 that may be coupled to the lock structure 162. As shown, the outer member 164 is coupled to the block 130 of the linkage assembly 120. The telescopic structure 160 (outer member 164) may be coupled proximate to the pivot 132 of the saw 104 with the frame 102. The inner member 166 is slidably disposed within the outer member 164 such that the inner member 166 may telescopically extend and retract relative to the outer member 164. The inner member 166 is biased into an extended position (shown in FIG. 2) relative to the outer member 164. The extended position corresponds to maximum outward extension of the inner member 166 relative to the outer member 164.

The inner member 166 may be biased to the extended position by a fluid, such as a pressurized fluid, stored within the outer member 164. In an embodiment, the fluid is stored under a predetermined pressure to bias the inner member 166 into the extended position. In certain implementations, the fluid stored inside the outer member 164 may be a gas such as a nitrogen gas. In certain implementations, the predetermined pressure may be in range of 30 pounds to 50 pounds. The predetermined pressure may vary based on the size and material of the workpiece 200, and the force required to keep the workpiece 200 within the fixture 106. In an embodiment, the telescopic structure 160 may be a fluid cylinder in which, in an embodiment of the present invention, a gas such as nitrogen comprises the working fluid, having a cylinder as the outer member 164, and the piston and piston rod together defining the inner member 166. In such a case, the fluid is stored within a head chamber defined by the cylinder and the piston.

In an implementation, the inner member 166 may be biased to the extended position by a resilient member disposed inside the outer member 164. In such a case, the resilient member may be coupled to both the inner member 166 and the outer member 164. In an embodiment, the resilient member may be a spring. The biasing of the inner member 166 to the extended position facilitates a locking of the workpiece 200, by the lock structure 162, within the fixture 106. Further, the telescopic structure 160 is configured to move the lock structure 162 relative to the workpiece 200 or the fixture 106 in response to the pivotal movement of the saw 104 relative to the frame 102.

The lock structure 162, at least partially, is disposed within the second cavity 150 of the fixture 106, and is pivotally coupled to the second sidewall 144. The lock structure 162 is pivotally coupled to the fixture 106 (second sidewall 144) via the pin 158. In an embodiment, the lock structure 162 is a disc structure. In such a case, the lock structure 162 is eccentrically coupled to the fixture 106 (second sidewall 144). Therefore, a pivot 170 (shown in FIG. 6) of the lock structure 162 is located away from a center 172 of the lock structure 162. As, the lock structure 162 is eccentrically coupled to the fixture 106, the lock structure 162 may act as a cam for locking the workpiece 200 within the fixture 106. In one or more implementations, the lock structure 162 is a cam.

Further, the lock structure 162 is also coupled with the telescopic structure 160. The lock structure 162 may be coupled to the inner member 166 of the telescopic structure 160. The inner member 166 may be coupled to the lock structure 162 at a location that is offset from the center 172 of the lock structure 162. The lock structure 162 is configured to pivot about the pivot 170 in response to a pivotal movement of the saw 104 relative to the frame 102.

The lock structure 162 is configured to move between a first position and a second position in response to the pivotal movement of the saw 104 relative to the frame 102. The lock structure 162 is configured to move to the first position when the saw 104 moves to the first position, and is configured to move towards the second position in response to the movement of the saw 104 towards the second position from the first position. The lock structure 162 returns towards the first position as the saw 104 moves from the second position to the first position. Further, the lock structure 162 is configured to move to a locking position to abut and lock the workpiece 200 within the fixture 106 when the saw 104 moves to the cutting position. As the lock structure 162 moves from the second position to the first position, the lock structure 162 moves towards the first sidewall 142 of the fixture 106. In so doing, a gap between the lock structure 162 and the first sidewall 142 decreases. In an implementation, in the first position of the lock structure 162, the lock structure 162 may contact the first sidewall 142, and in the second position, the lock structure 162 is positioned away from the first sidewall 142 and the first cavity 146. Further, in the locking position, the lock structure 162 is configured to lock the workpiece 200 within the fixture 106 by an extension of the lock structure 162 into the first cavity 146. Although the lock structure 162 is disc shaped, other shapes of the lock structure 162, such as an elliptical shape, a rectangular shape may be contemplated.

INDUSTRIAL APPLICABILITY

A cutting operation for cutting the workpiece 200 using the cutting assembly 100 is now discussed. For cutting the workpiece 200, a suitable length of the workpiece 200 is positioned inside the first cavity 146 of the fixture 106. To enable positioning of the workpiece 200 within the first cavity 146 of the fixture 106, an operator may move the saw 104 to the second position. After positioning the workpiece 200 within the fixture 106, the operator may move the saw 104 in a downward direction towards the first position. In response to the pivotal movement of the saw 104 towards the first position, the telescopic structure 160 moves towards the second end 112 of the frame 102, thereby facilitating a movement of the lock structure 162 towards the first position as the lock structure 162 pivots about the pivot 170.

On movement of the saw 104 towards the first position, the saw 104 may reach to the cutting position. In the cutting position, the cutter 118 may contact the workpiece 200. Further, as the saw 104 reaches the cutting position, the lock structure 162 reaches the locking position to abut and lock the workpiece 200 within the first cavity 146 of the fixture 106. The abutment of the lock structure 162 with the workpiece 200 may cause the inner member 166, at least partly, to retract within the outer member 164. As the inner member 166 retracts into the outer member 164, a biasing force is exerted on the inner member 166 to keep the inner member 166 in the extended position. This biasing force is transmitted to the lock structure 162 to keep the lock structure 162 in contact with the workpiece 200 and enable a locking and retention of the workpiece 200 within the fixture 106. Thus, the locking of the workpiece 200, by the lock structure 162, is facilitated by biasing the inner member 166 to the extended position. Therefore, the cutting assembly 100 enables an automatic locking of the workpiece 200 within the first cavity 146 of the fixture 106, during cutting.

After reaching the cutting position, the operator may further move the saw 104 towards the first position thereby enabling the cutting of the workpiece 200. The workpiece 200 is cut by a cutting action of the cutter 118. In an embodiment, the cutter 118 is electrically operated to perform cutting of the workpiece 200. As the cutter 118 is operated and correspondingly the saw 104 is moved downward to reach the first position, the cutting of the workpiece 200 may be completed. Further, the retention of the workpiece 200 within the first cavity 146 is enabled by a force applied by the lock structure 162 on the workpiece 200 due to the biasing force acting on the inner member 166. The biasing force acts on the inner member 166 due to a retraction of at least a portion of the inner member 166 within the outer member 164. After cutting the workpiece 200, the operator may lift the saw 104 to the second position from the first position. The lifting of the saw 104 to the second position causes a movement of the lock structure 162 away from the locking position to the second position. This causes a disengagement of the lock structure 162 from the workpiece 200, enabling an easy removal of the workpiece 200 from the fixture 106. Therefore, the cutting assembly 100 of the present disclosure enables an easy and automatic locking and unlocking of the workpiece 200 from the fixture 106—thereby saving time and labor involved in the cutting operation. Further, as the cutting assembly 100 is a portable cutting assembly, the cutting assembly 100 may be moved easily to an assembly location in a plant to perform cutting operation—thereby saving assembly time and associated cost.

What is claimed is:

1. A cutting assembly for cutting a workpiece, the cutting assembly comprising:
    a frame;
    a fixture coupled to the frame and configured to receive the workpiece;
    a saw having a cutter to cut the workpiece, and pivotally coupled to the frame; and
    a locking assembly for locking the workpiece within the fixture, the locking assembly including:
        a lock structure pivotally coupled to the fixture, the lock structure configured to lock the workpiece within the fixture;
        a telescopic structure coupled to the saw and the lock structure, and configured to move the lock structure in response to a pivotal movement of the saw, wherein the telescopic structure facilitates a locking, by the lock structure, of the workpiece within the fixture; and wherein the telescopic structure includes an outer member and an inner member slidably disposed within the outer member.

2. The cutting assembly of claim 1, wherein the inner member is coupled with the lock structure and is biased to an extended position relative to the outer member to facilitate the locking of the workpiece within the fixture.

3. The cutting assembly of claim 2, wherein the inner member being biased to the extended position by a pressurized fluid stored inside the outer member.

4. The cutting assembly of claim 1, wherein the lock structure includes a disc structure coupled eccentrically to the fixture.

5. The cutting assembly of claim 1, wherein the fixture defines a first cavity to receive the workpiece, and a second cavity in a sidewall of the fixture to receive the lock structure.

6. The cutting assembly of the claim 1, wherein the saw includes a linkage assembly pivotally coupled to the frame to enable the pivotal movement of the saw between a first position and a second position.

7. The cutting assembly of the claim 6, wherein the saw is moveable to a cutting position between the first position and the second position, wherein the lock structure is configured to engage and lock the workpiece in the cutting position of the saw.

8. The cutting assembly of claim 6, wherein the telescopic structure is coupled to the linkage assembly.

9. The cutting assembly of claim 6 further including a pin configured to engage the linkage assembly with the frame to prevent the pivotal movement of the saw.

10. A cutting assembly for cutting a workpiece, the cutting assembly comprising:
a frame;
a fixture coupled to the frame and configured to receive the workpiece;
a saw having a cutter to cut the workpiece, and pivotally coupled to the frame; and
a locking assembly for locking the workpiece within the fixture, the locking assembly including:
a lock structure pivotally coupled to the fixture, the lock structure configured to lock the workpiece within the fixture; and
a telescopic structure configured to move the lock structure in response to a pivotal movement of the saw, the telescopic structure including an outer member and an inner member slidably disposed within the outer member, the inner member is coupled with the lock structure and is biased to an extended position relative to the outer member to facilitate a locking, by the lock structure, of the workpiece within the fixture.

11. The cutting assembly of claim 10, wherein the inner member being biased to the extended position by a pressurized fluid stored inside the outer member.

12. The cutting assembly of claim 10, wherein the lock structure includes a disc structure coupled eccentrically to the fixture.

13. The cutting assembly of claim 12, wherein the inner member is coupled to the disc structure at an offset to a center of the disc structure.

14. The cutting assembly of claim 10, wherein the fixture defines a first cavity to receive the workpiece, and a second cavity in a sidewall of the fixture to receive the lock structure.

15. The cutting assembly of claim 14, wherein the lock structure is configured to lock the workpiece within the fixture by an extension of the lock structure into the first cavity.

16. The cutting assembly of the claim 10, wherein the saw includes a linkage assembly pivotally coupled to the frame to enable the pivotal movement of the saw between a first position and a second position.

17. The cutting assembly of the claim 16, wherein the saw is moveable to a cutting position between the first position and the second position, wherein the lock structure is configured to engage and lock the workpiece in the cutting position of the saw.

18. The cutting assembly of claim 16, wherein the linkage assembly is coupled to the outer member of the telescopic structure.

19. The cutting assembly of claim 16 further including a pin configured engage the linkage assembly with the frame to prevent the pivotal movement of the saw.

* * * * *